March 22, 1927.

J. PELLINI

ELECTRIC CELL WITH CONSTANT INTENSITY

Filed June 30, 1925 2 Sheets-Sheet 1

INVENTOR:
Joseph Pellini
BY Ruegr, Boyer & Bachelor
ATTORNEYS.

March 22, 1927. 1,621,518
J. PELLINI
ELECTRIC CELL WITH CONSTANT INTENSITY
Filed June 30, 1925 2 Sheets-Sheet 2

INVENTOR:
Joseph Pellini
BY:
Rugg, Boyn & Bakelee.
ATTORNEYS.

Patented Mar. 22, 1927.

1,621,518

UNITED STATES PATENT OFFICE.

JOSEPH PELLINI, OF MARSEILLE, FRANCE.

ELECTRIC CELL WITH CONSTANT INTENSITY.

Application filed June 30, 1925, Serial No. 40,477, and in France November 22, 1924.

This invention relates to electric batteries, the object of the invention being to provide a two-liquid battery the current intensity of which will be constant for a predetermined time, which battery is of very simple construction and at the same time extremely resistant, light and economical in use.

A further object of the invention is to provide an electrolyte which may be prepared beforehand at small cost, said electrolyte being made up of two distinct liquids the proportions of which may be chosen so as to determine the approximate life of the charge, and by means of which the battery may be re-charged without danger regardless of the surroundings.

With the foregoing and other objects in view, which will appear as the description proceeds, the invention consists in the novel features of construction and combination of parts which will be more fully described hereinafter and particularly pointed out in the claims.

In the accompanying drawing.

The same characters of reference designate the same parts in the different figures of the drawing.

Figure 1:
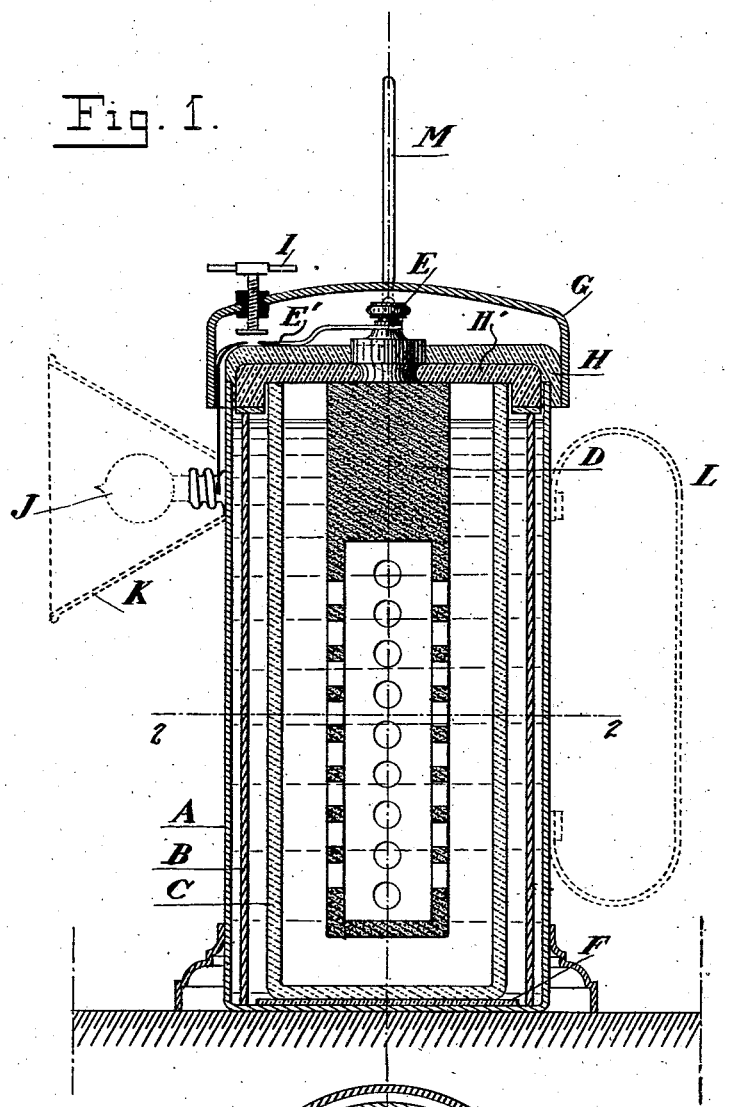
Fig. 1 is a vertical central section of a battery embodying the features of the present invention, and showing in dotted lines a light bulb, a reflector and a handle attached to said battery.

Referring to the drawing, the body of the battery comprises a cylindrical metallic casing A, concentrically within which are disposed a cylindrical zinc element B, a porous member C and a carbon D, the latter being preferably formed of pure carbon and made hollow and perforated so as to increase the reacting surface, said carbon carrying at its upper end a terminal binding post E.

The porous member C is insulated from the casing A by means of a disk F, preferably of rubber, a tightly fitting cover G being provided to insure hermetic sealing of the battery, said cover being secured to the casing preferably by bayonet joint or equivalent means. A flanged fiber or wooden washer H and a rubber washer H' are disposed between the cover G and the members A, B and C, thereby to insure a perfect seal and insulation of the members one from the other. As shown clearly in Fig. 1, the terminal E forming the positive pole, passes through the washers H and H', the latter serving as a support for the carbon element D. The casing A serves as the negative pole, and a switch I having a stem threaded through a block of insulating material disposed in an opening in the cover G, is adapted to bridge a gap between two strips of metal A' and E' secured respectively to the members A and E, said switch being provided with a crossbar by means of which the switch may be rotated to close or open the battery circuit.

In practice the porous vessel C is filled with a depolarizing solution, said vessel being in turn immersed in an electrolyte carried by the casing A. The current intensity of the battery varies with the degree of porosity of the vessel C, whereby more or less rapid action of one solution upon the other is permitted.

The electrolyte preferably comprises approximately 150 grams of magnesium sulphate (bitter salt), approximately 150 grams of potassium sulphate, and 50 grams of sodium sulphate, dissolved in 1 litre of water (A. F.).

The depolarizing liquid consists of approximately 180 grams of sodium bichromate dissolved in 1 litre of water, and approximately 5 centilitres of sulphuric acid added thereto.

Figure 2:
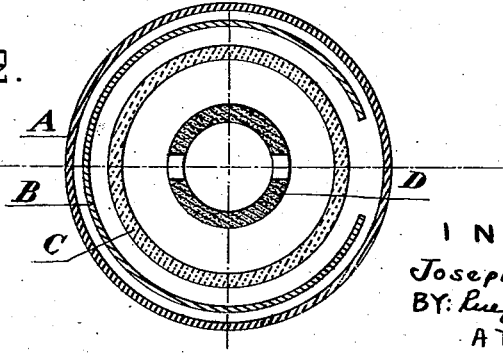
Fig. 2 is a horizontal sectional view taken approximately on the line 2—2 of Fig. 1.
Figure 3:
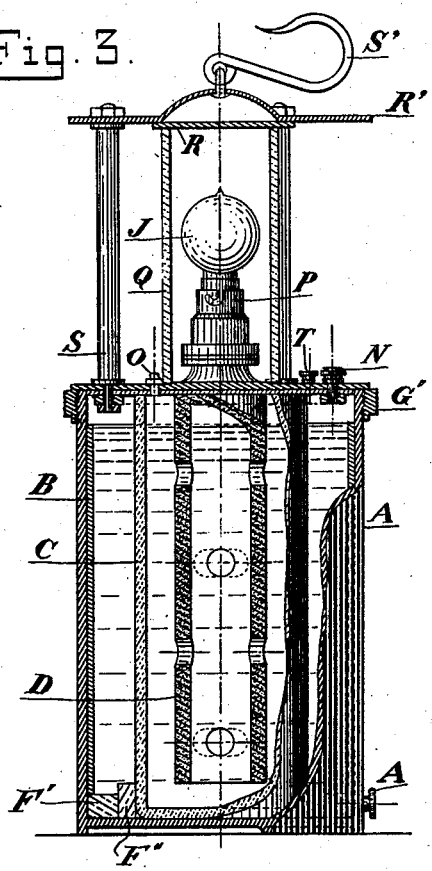
Fig. 3 is a side elevation, partly in section, of a battery, showing one special application thereof.

In the form illustrated in Fig. 3, the tubular carbon element D' is shown as having its lower end open thereby to permit freer access of the depolarizing liquid to the interior thereof, while the zinc element B' is disposed in contact with the casing A instead of being spaced therefrom as in Figs. 1 and 2, insulating washers F', F'', preferably formed of rubber, being provided for retaining the porous vessel C properly spaced from the member B'. In this form the battery is shown as forming the body of a lamp, and for this purpose is provided with a flat cover or lid G' which is provided with filling orifices normally closed by plugs N and O, the casing A being provided near its bottom with an outlet port normally closed by a plug A', whereby the liquid may be drawn off whenever desired.

Figure 4:
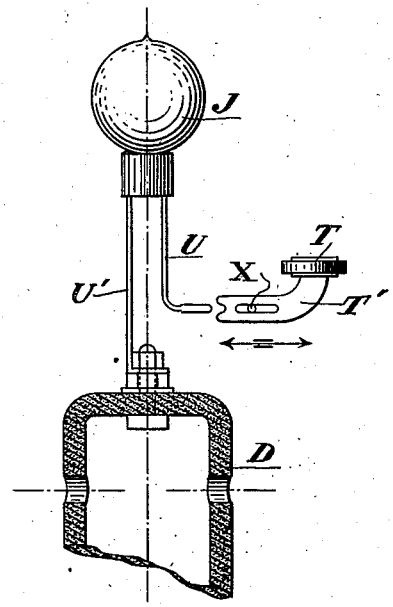
Fig. 4 is a fragmentary sectional view illustrating, on a slightly enlarged scale, an organization in which the light may be operated by means of an ordinary push button.

Attached to the cover G' at the center thereof is a light holder or socket P in which is secured a light bulb J, and for the protection of this bulb a glass tube Q is provided, said tube being secured in bulb-encircling position between the cover G' and a metal disk R', said disk being supported by a pair of standards or rods S secured at their lower ends in the cover G', a rubber washer R being disposed between the end of the glass tube and the disk R'. The disk is so constructed as to form a reflector for the light, and a hook S' is attached to the center of the disk whereby the device may be suspended from an overhead support as with the ordinary miner's lamp. A switch T is provided for operating the light. The operation of this switch is shown diagrammatically in Fig. 4. The switch button may be provided with a stem T' having a slot which is engaged by a pin X carried by the cover G', said pin forming one pole of the battery. By operating the switch backwards and forwards as indicated by the arrows in Fig. 4 the stem T' is carried into and out of contact with the enlarged end of the wire U leading to the lamp J, which is connected by the wire U' to the carbon electrode D of the battery.

Figure 5:
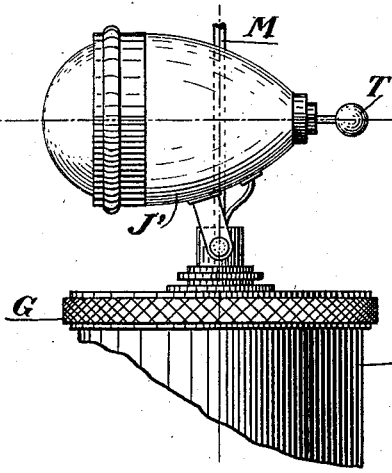
Fig. 5 is a partial side elevation illustrating a modified organization of the battery and lamp.
Figure 6:
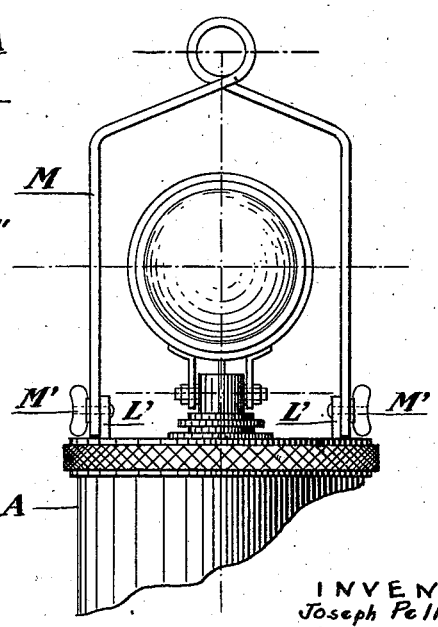
Fig. 6 is a view taken at right angles to Fig. 5.

In the embodiment shown in Figs. 5 and 6, the lid G' is provided with a centrally disposed bushing upon which a parabolic reflector J' is pivotally mounted, in which reflector is secured a light bulb adapted to be placed in circuit with the battery by a switch disposed in the reflector and operated by a rod having an enlarged head T". In this form the battery is shown provided with a bail handle M secured by means of thumb screws M' to perforated ears or lugs L' carried by the cover. A similar bail handle M is shown carried by the structure illustrated in Fig. 1, whereby said structure is adapted to be suspended from an overhead support.

From the foregoing it will be seen that the battery herein described is adapted for a large variety of applications, and while I have described in detail the structures herein illustrated, it is to be understood that these structures are not intended to limit my invention to the precise features of construction shown, but are for purposes of illustration only.

Having thus described my invention, what I claim is:

1. A two-liquid electric battery having a constant intensity for a predetermined time, comprising an outer vessel forming the negative element, a centrally disposed hollow perforated carbon member forming the positive element, a porous tubular member within said outer vessel and separating the same from said carbon member, an electrolyte consisting of a solution of magnesium sulphate, potassium sulphate and sodium sulphate in water carried by said outer vessel between it and said porous member, and a depolarizing liquid carried within said porous member and composed of a slightly acidulated solution of sodium bichromate in water, the relative proportions of the depolarizing liquid and electrolyte being regulated so as to retain constant intensity for a predetermined time.

2. A two-liquid electric battery having a constant intensity for a predetermined time, comprising an outer vessel forming the negative element, a centrally disposed hollow perforated carbon member forming the positive element, a porous tubular member within said outer vessel and separating the same from said carbon member, an electrolyte consisting of a water-solution of magnesium sulphate, potassium sulphate and sodium sulphate in the relative proportions by weight of 150, 150 and 50 respectively, said electrolyte being carried within said outer vessel between it and said porous member, and a depolarizing liquid carried within said porous member and composed of a water-solution of sodium bichromate containing a small quantity of sulphuric acid.

In testimony whereof I have signed my name to this specification.

JOSEPH PELLINI.